(12) United States Patent
Kitano et al.

(10) Patent No.: US 6,591,949 B2
(45) Date of Patent: Jul. 15, 2003

(54) IMPACT ENERGY ABSORBING MEMBER

(75) Inventors: Akihiko Kitano, Matsuyama (JP); Tomoyuki Shinoda, Matsuyama (JP); Hitoshi Nishiyama, Matsuyama (JP); Takuya Karaki, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/913,792

(22) PCT Filed: Dec. 15, 2000

(86) PCT No.: PCT/JP00/08886

§ 371 (c)(1), (2), (4) Date: Oct. 15, 2001

(87) PCT Pub. No.: WO01/44679

PCT Pub. Date: Jun. 21, 2001

(65) Prior Publication Data

US 2002/0179390 A1 Dec. 5, 2002

(30) Foreign Application Priority Data

Dec. 17, 1999 (JP) .............................. 11-358656

(51) Int. Cl.$^7$ ................ F16F 7/00; B60J 5/04
(52) U.S. Cl. ..................................... 188/371
(58) Field of Search .................. 188/371; 5/783.1, 5/783.11, 793; 428/73, 116, 118

(56) References Cited

U.S. PATENT DOCUMENTS 5,106,668 A * 4/1992 Turner et al. ............... 428/116

FOREIGN PATENT DOCUMENTS

| DE | 44 23 741 A1 | * | 1/1996 |
| JP | 5-32147 A | | 2/1993 |
| JP | 9-2178 A | | 1/1997 |
| JP | 9-95197 A | | 4/1997 |

* cited by examiner

Primary Examiner—Christopher P. Schwartz
(74) Attorney, Agent, or Firm—Kubovcik & Kubovcik

(57) ABSTRACT

The present invention is an impact energy absorption member that is characterized by comprising a long member of fiber reinforced resin having a lengthwise direction and a thickness direction, wherein the ratio of the thickness t (mm) of the long member to the length L (mm) thereof is within the range of 1/11000 to 6/1000 as well as the direction of an external force is substantially in agreement with the thickness direction of the impact member. The member of the present invention sufficiently absorbs impact energy from a moving body when collision occurs and greatly increases safety to collision of transportation equipment, for example, a motor car and the like as well as is light in weight and compact, whereby the member can improve resistance against environment and saves energy. Further, when this member is applied to a house and a building against which the transportation equipment may collide, it can reduce the loss of social properties.

21 Claims, 13 Drawing Sheets

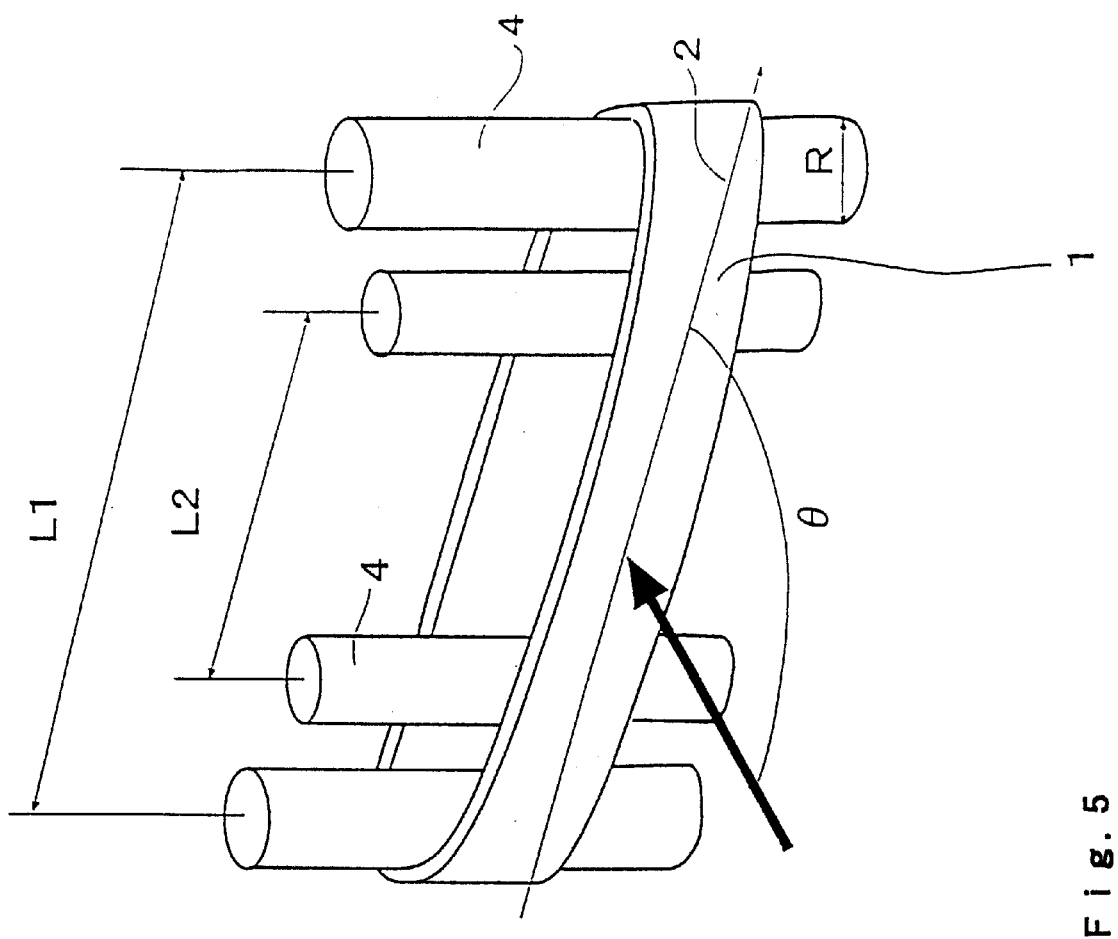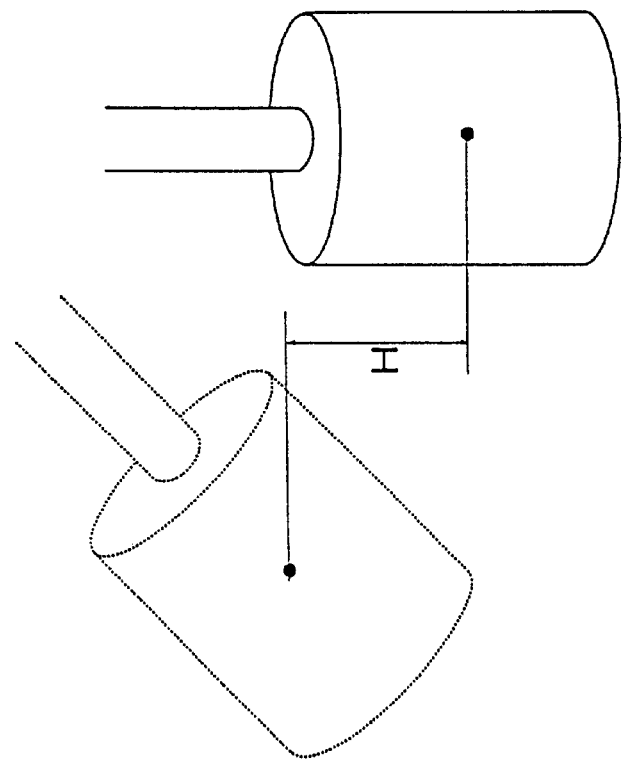
Fig. 5

IMPACT ENERGY ABSORBING MEMBER

TECHNICAL FIELD

The present invention relates to an impact energy absorption member used to absorb impact energy to prevent the damage of transportation equipment by absorbing impact energy generated in the collision thereof, the transportation equipment including vehicles such as a passenger car, a track, and the like, airplanes such as a passenger plane and the like, vessels such as a fishing boat, a ferry boat, and the like, railroad cars such as an electric car, a monorail car, and the like.

BACKGROUND ART

Transportation equipment such as vehicles, motor cars, and the like which has a possibility of collision while it moves is provided with an impact energy absorption mechanism for protecting an equipment main body and the life of crews from the impact generated in the collision. A hollow metal frame, a polymer-formed material, and so on, for example, have been used as a conventional impact energy absorption member.

Incidentally, a mechanism in which the conventional impact energy absorption member absorbs energy is such that a metal- or polymer-formed material receives an impact force, is deformed by compression or bending, and absorbs impact energy through the subsequent plastic deformation or breakage thereof.

For example, Japanese Unexamined Patent Application Publication No. 9-2178 proposes an impact absorption structure for the interior member of motor cars for absorbing impact by that a rib portion is pressed and deformed by being bent. The publication exhibits characteristics such as an elastic modulus in bending, Izod strength, and the like.

Further, Japanese Unexamined Patent Application Publication No. 9-95197 proposes an energy absorption structure for the side portion of a vehicle body capable of effectively absorbing energy in such a manner that a rib portion is elastically deformed and a load sequentially increases accordingly. The publication further describes a shape having a hollow portion.

Furthermore, Japanese Unexamined Patent Application Publication No. 5-32147 proposes an impact energy absorption member for a bumper using a fiber-reinforced composite material. The mechanism of the composite material is such that when the material is deformed by compression, it is exfoliated and broken so that energy to be absorbed thereby increases.

However, since the conventional impact energy absorption members utilize plastic deformation and breakage due to compression as described above, the wall thickness of a member cannot help being increased, that is, the member cannot help being formed in a bulky shape such as a hollow shape together with an increased wall thickness in order to absorb a large amount of energy which is generated in collision at a high speed. Thus, these conventional impact energy absorption members are disadvantageous in that the space of a cabin of transportation equipment is reduced and the dwelling property thereof is scarified and further the overall weight of the impact energy absorption members increases and gas mileage is lowered, which is undesirable from an economical and environmental viewpoint.

In contrast, the transportation equipment is required to greatly reduce its weight from the view point of administration for protecting environment. It is expected to apply a sophisticated composite material, that is, a fiber-reinforced composite material (hereinafter, abbreviated as FRP) that seems to greatly reduce a weight and to improve durability as a material to be replaced with a metal material. However, the FRP is a material that does not almost exhibit plastic deformation and has compression and bending strength which is almost the same as that of the metal material while the FRP has tensile strength that is larger than that of the metal material. Therefore, it is difficult to actually use the FRP at present because the FRP does not have a sufficient merit in the reduction of weight in the conventional impact energy absorbing mechanism which is broken in the compression and bending modes.

Accordingly, a first object of the present invention is to provide a light and compact impact energy absorption member that makes use of the aforementioned bending and compression modes and can eliminate the drawbacks of the conventional heavy and bulky impact energy absorption member for transportation equipment and sufficiently absorb impact energy from a moving body in the occurrence of collision.

In particular, it is an urgent matter to establish compatibility between safety against collision from various directions and reduction in weight of an impact energy absorbing apparatus from the special circumstances in which motor vehicles for personal use occupy almost all the portion of the transportation equipment. Thus, a second object of the present invention is to provide a means for solving the above problem.

DISCLOSURE OF INVENTION

An impact energy absorption member of the present invention is characterized by comprising a long member of fiber reinforced resin having a lengthwise direction and a thickness direction, wherein the ratio($t/L$) of the thickness $t$ (mm) of the long member to the length $L$ (mm) thereof is within the range of 1/11000 to 6/1000 as well as the direction of an external force is substantially in agreement with the thickness direction of the impact member.

When the impact energy absorption member of the present invention is used, it is jointed and fixed mechanically and/or through bonding to portions where the member is desired to absorb impact energy such as the insides of a door and a bumper, the inner surface and the external surface of a side panel, the rear portion of an engine, the periphery of a cabin for crews, and the like.

BRIEF DESCRIPTION OF THE DRAWINGS

FIG. 5 is a perspective view of a pendulum impact test method including a method of mounting an impact energy absorption member of the respective embodiments;

REFERENCE NUMERALS

Figure 1:
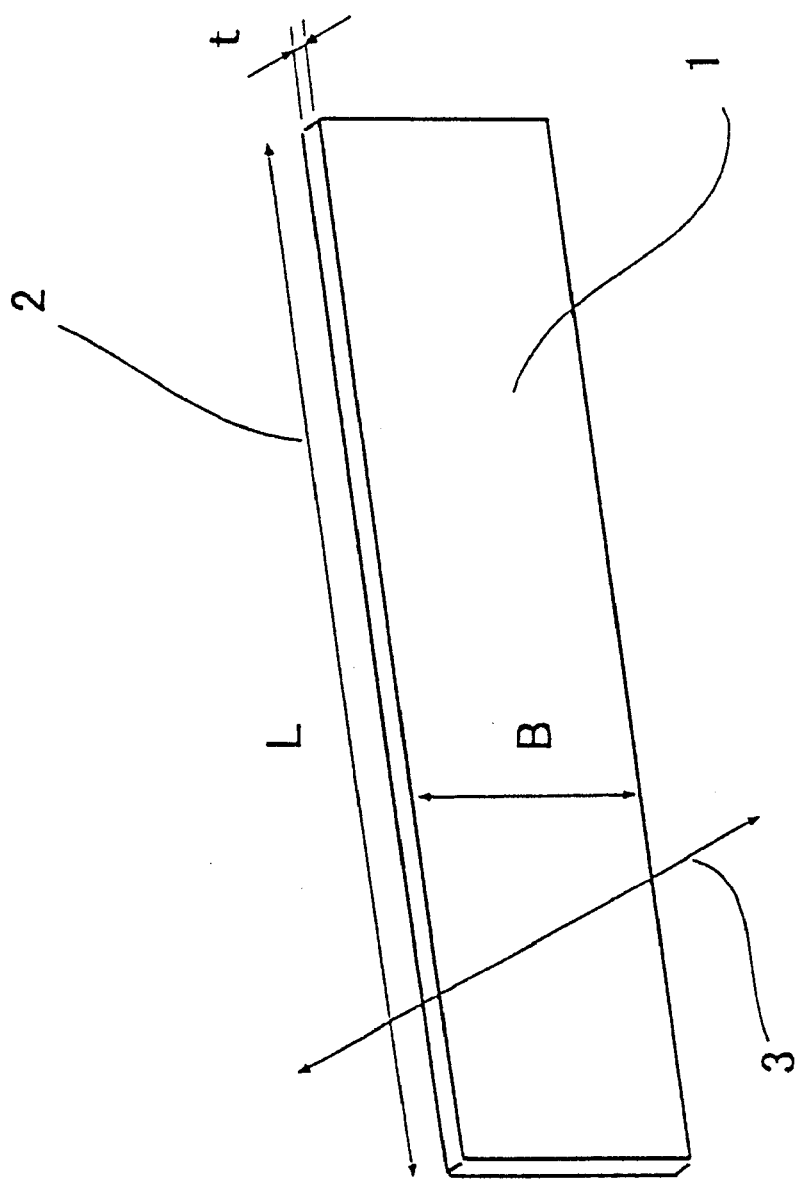
FIG. 1 is a perspective view showing an embodiment of an impact energy absorption member of the present invention.

1: long member
1A–1C: impact energy absorption member
2: lengthwise direction
3: thickness direction
4: fixing jig (pin)
5: support member
6: support member with bearing
7: reinforcing portion of long member
8: motor car
9: door
10: rotatable bar
11: connecting member
L: length
t: thickness
B: width
R: diameter of fixing jig
L1: entire span
L2: distance between pins

BEST MODE FOR CARRYING OUT THE INVENTION

Preferable embodiments of the present invention will be described below with reference to the accompanying drawings.

FIG. 1 is a perspective view showing an embodiment of an FRP impact energy absorption member according to the present invention.

First, the impact energy absorption member of the present invention is composed of an FRP long member having a lengthwise direction and a thickness direction. The long member 1 is a generic term representing members formed in a so-called sheet-shape, rope-shape, belt shape, and the like which are long with respect to a sectional area. Almost all the cross sections (lateral cross sections), which are perpendicular to a lengthwise direction, of these shapes are liable to generate tension against an impact force. Of these members, the sheet-shaped member is particularly preferable. The lengthwise direction 2 literally means a direction in which the length of the long member is maximized, and the length is several tens of centimeters to several meters when it is a member used for motor cars. The lengthwise direction is not in coincidence with a direction of the impact force, and the impact force is vertical to the lengthwise direction or has a certain angle thereto (θ of FIG. 5 to be described later). The thickness direction 3 is a direction approximately vertical to the lengthwise direction and in approximate agreement with a direction in which the long member is most deformed when it is subjected to the impact force. That is, the impact force itself is caused to be in substantial agreement with the thickness direction by tension even if it is not vertical to the lengthwise direction of the long member. Further, the FRP in the present invention is a fiber simple body which is composed of reinforcing fibers such as carbon fibers, aramid fibers, glass fibers, and the like and formed in a braided-string-shape or in a twisted-fiber-shape or the fiber simple body partly impregnated with resin.

The ratio (t/L) of the thickness t (mm) to the length (L) of the long member is within the range of 1/11000 to 6/1000. A so-called sheet-shaped member having a thin thickness is preferable. The impact energy absorption member of the present invention is disposed so that the direction in which the impact force acts is in substantial agreement with the thickness direction. As described above, since the impact energy absorption member of the present invention has a long size and a thin wall thickness, even if the impact force acts thereon, it is not broken by being bent or compressed so that it can absorb energy until it is broken by being extended (for example, as shown in the embodiment, when a carbon-fiber-reinforced composite material (hereinafter, abbreviated as "CFRP") is compared with a high tension steel, the amount of energy absorbed by the CFRP is about ten times as large as that absorbed by the high tension steel and further the specific gravity of the CFRP is about one fifth that of the high tension steel, thus the CFRP has a very high weight reducing effect.). Breakage may be caused by elongation even at a value smaller than the above lower limit value. However, when the long member is used as a member for transportation equipment, the absolute value of the amount of energy absorbed by the member is not sufficient in this case. Further, the long member is not always broken by being extended even at a value larger than the above upper limit value. The above ratio t/L is preferably 1/11000 to 3/1000, more preferably 1/4000 to 3/1000 and most preferably 1/3000 to 2/1000.

Furthermore, the impact energy absorption member of the present invention is a member substantially the entire cross section of which is deformed by being extended when it is tested by a pendulum impact test method which will be described later.

The pendulum impact test method mentioned in the present invention is a scaled-up Charpy test method (refer to JIS-7111 and ISO-179). As shown in FIG. 5, the endless long member 1 is stretched around pins 4 acting as fixing jigs fixed to a not shown highly rigid frame without looseness (pretension of 0.1 to 1 Kg is applied to the long member 1). The pins at both the ends of the four pins have an interval L1 which is equal to the length (entire span) of the long member, and the remaining two pins have an interval L2 which is 80% of the entire span. Then, a columnar cone having a weight of 3 to 1 kN and R=200 to 100 mm is struck against the long member 1 at the center of the span thereof at a speed at which the long member 1 is broken (the speed is adjusted at a height H from which the cone is swung). Note that the entering angle θ of the pendulum in this case is within the range of 30 to 90°. The entering angle can be set by adjusting the positions of a frame and the cone.

The amount of absorbed energy is calculated by a method of an ordinary Charpy test from the height to which the pendulum rises after it applies impact to the long member 1. The height to which the pendulum rises also can be determined by recording the state of the pendulum by a video camera. Specifically, the amount of absorbed energy E is calculated by the following formula $$E = \frac{1}{2}(WV^2) - Wgh$$

(g: gravity)
or, $$E = Wg(H-h)$$

where, W shows weight of pendulum, V shows velocity, and h shows height to which pendulum rises.

Figure 13:
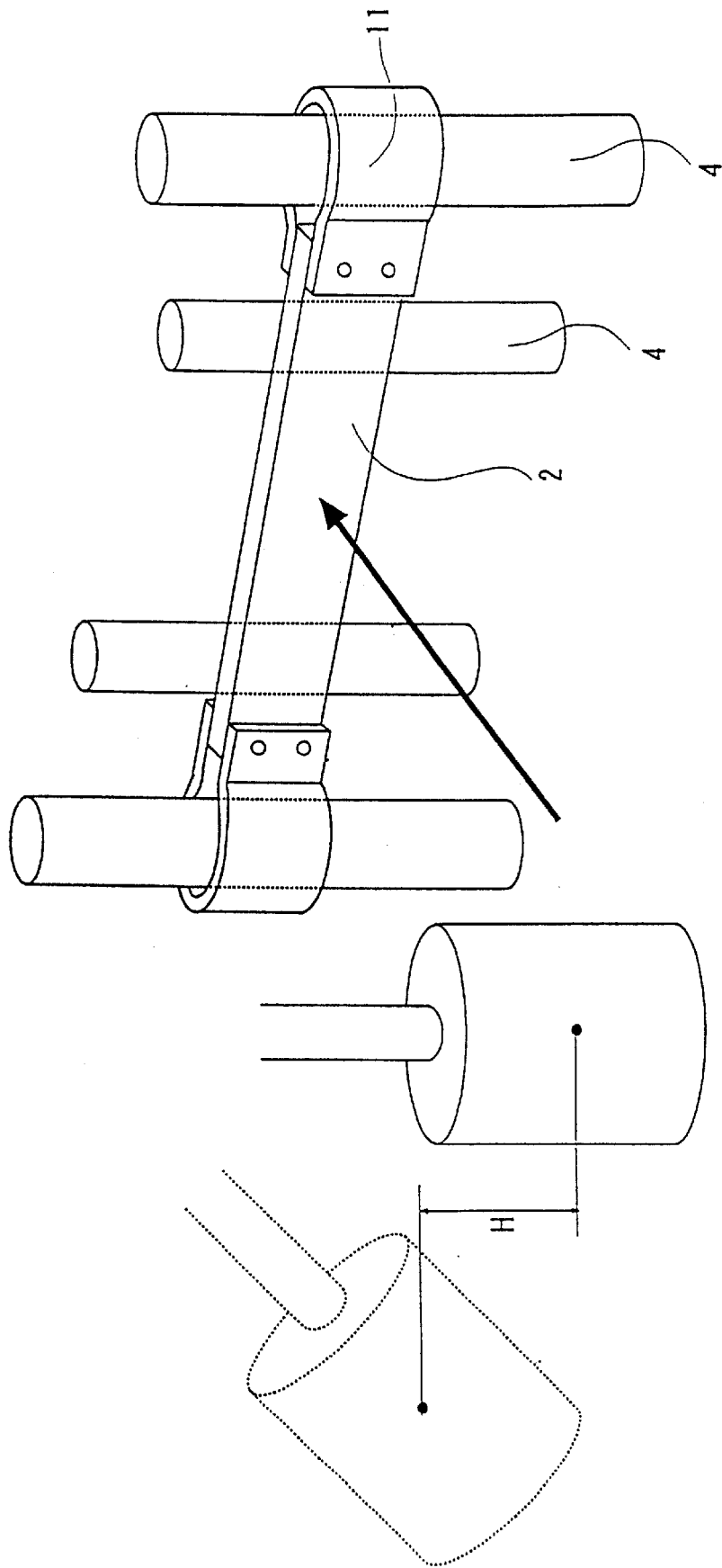
FIG. 13 is a perspective view of a pendulum impact test method including a method of mounting the impact energy absorption members of the respective embodiments.

It should be noted that when the long member cannot directly be fixed to the pins because it is difficult to process the long member in the endless shape, the amount of absorbed energy can be measured by executing the pendulum test after connecting members (reference numeral 11 of FIG. 13) are jointed to the long member by an adhesive or bolts so that the long member can be fixed to the pins therethrough. At this time, it is necessary that the connecting members and connecting portions be stronger than the long member so that breakage occurs not in the connecting members and the connecting portions but in the long member. Specifically, the connecting portions are composed of a FRP having high strength or a metal material. Further, when the long member is too long, the length thereof can be adjusted by suitably cutting it.

At this time, it is preferable that the long member 1 of the present invention be deformed by being extended in the lengthwise direction (extended) and tensile stress occur in approximately the entire cross section (cross section perpendicular to the lengthwise direction, that is, lateral cross section). That is, the long member is deformed in a direction where the length thereof increases on the side thereof where impact is applied as well as on the side opposite to the above side in the pendulum impact test. In general, when the long member is deformed by being bent, an impacted side is compressed and an opposite side is extended. Whether or not the long member is deformed by being extended can be confirmed by directly bonding a strain gauge thereon and monitoring a change of strain while impact is applied to the long member. Further, whether or not the long member is broken by being extended can be confirmed by identifying a broken surface by fractography. In the FRP, a surface broken by elongation exhibits an aspect of great irregularity in which many fibers are fallen out and pulled out.

It is preferable that the impact energy absorption member of the present invention have an amount of energy absorbed per unit weight of at least 3.9 J/g in the above pendulum impact test. When the impact energy absorption member of the present invention has the amount of energy absorbed per unit weight of at least 3.9 J/g, it is made suitable for transportation equipment and the like that are closely related to gas mileage. As shown in comparative examples which will be described later, the impact energy absorption member of the present invention can absorb energy per unit weight in an amount several times larger than that of the metal material. Note that the proper upper limit range of the amount of energy absorbed per unit weight of materials that can be used for the transportation equipment is about 50 J/g from a view point of cost.

Further, the amount of energy absorbed per unit volume is suitably within the range of 5 to 40 J/cm$^3$. Setting the amount within this range permits the effective space in the transportation equipment to increase as well as the cost of the impact energy absorption member to be accepted by the transportation equipment, which makes the impact energy absorption member more preferable.

FIG. 1 is a view showing a thin sheet member acting as an embodiment of the long member 1. The sheet member has a length L (mm), a width B (mm) and a thickness t (mm) and further has a lengthwise direction denoted by reference numeral 2 and a thickness direction denoted by reference numeral 3. An impact load (external force) acts approximately in the thickness direction, that is, in a direction approximately vertical to the longitudinal direction or at an angle θ (within the range of 30 to 90°) with respect to the longitudinal direction. As mentioned later, the length, width, and thickness of the long member 1 need not be always uniform. When the length, width, and thickness are not uniform, however, they will be represented by average values.

The FRP in the present invention means fiber-reinforced resin containing reinforcing fibers and matrix resin. The reinforcing fibers mainly bear the tensile load generated in a sheet member, and it is not always necessary for the resin to cover all the fibers. That is, the FRP may has portions composed only of the reinforcing fibers. The portions composed only of the reinforcing fibers has a feature that they are very flexible and can be deformed along portions having a complex shape.

Used as the reinforcing fibers are fibers including inorganic fibers such as carbon fibers, glass fibers, alumna fibers, silicon nitride fibers, etc.; polyamide synthetic fibers such as aramid fibers, nylon, etc.; organic fibers such as aramid fibers, PBO (polybenzoxazine) fibers, polyolefin fibers, polyester fibers, polyphenyl sulfon fibers; and the like. These fibers can be used independently or in a mixture of at least two kinds thereof.

The carbon fibers are particularly useful because they have high strength and high elastic modulus and are excellent in corrosion resistance. The carbon fibers may be any of PAN (polyacrylnitrile) carbon fibers and pitch carbon fibers. Among them, however, PAN carbon fibers are preferable because they have a wide variation of the aforementioned elongation. When it is desired to provide the impact energy absorption member with firmness, it is preferable to select carbon fibers having an elastic modulus of 200–600 Gpa, whereas when it is desired to provide the impact energy absorption member with flexibility, it is preferable to select carbon fibers having strength within the range of 3 to 10 Gpa. When it is desired to maintain the stabilized shape of the impact energy absorption member for a long period of time, the carbon fibers can be preferably used because they have a less amount of creep deformation among the reinforcing fibers. For example, when it is required to apply pretension to the impact energy absorption member from the relation thereof to a mounting portion which will be described later, the disposition of the carbon fibers in the direction of tension permits impact energy to be effectively absorbed. Further, it is preferable that the carbon fibers have a diameter of 5 to 15 μm to effectively exert tensile strength.

Further, glass fibers (in particular, fiber-like glass such as E glass, C glass, S glass, etc.) are preferable because tensile strength and compression strength are balanced therein. In the present invention, it is preferable that fibers have a diameter of 5 to 15 μm in consideration of creep characteristics. When the fiber diameter is larger than this range, creeps are liable to be generated by a flaw on a surface. Further, the fiber diameter outside of this range reduces productivity.

Aramid fibers that have high elongation and strength are preferably used as the organic fibers. This is because that the aramid fibers have resistance to acid that is often used in the transportation equipment as well as have very high strength of 2.5 to 3.8 GPa so that impact energy can be absorbed with a small amount of them. Widely used as the aramid fibers are Kevlar fibers. Since the specific gravity of the Kevlar fibers is smaller than those of the carbon fibers and the glass fibers, it can be used also when it is desired to reduce the weight of the impact energy absorption member. For example, when several fibers of the reinforcing fibers, which are used in an impact energy absorption member made of carbon fibers, are composed of Kevlar fibers, the weight of the impact energy absorption member can be more reduced. Further, since the organic fibers are non-conductive similar to the glass fibers, covering the carbon fibers with the organic fibers can entirely or partly make the surface of the impact energy absorption member non-conductive.

Any known shape such as a stand shape, a lobing shape, a spun-yarn shape, a woven-shape, a covering yarn shape may be employed as the shape of the fibers. However, the strand shape and the lobing shape are preferable to obtain an impact energy absorbing capability, that is, high tensile characteristics. Further, the rope and the like disclosed in Japanese Unexamined Patent Application Publication No. 11-302978 are also preferable shapes.

The reinforcing fibers used in the impact energy absorption member of the present invention are disposed in a lengthwise direction of a sheet to absorb impact energy by tensile deformation. However, the direction in which they are disposed need not be in strict agreement with the lengthwise direction. Even if the reinforcing fibers are disposed with a tilt of about ±5° with respect to the axis of the sheet in the lengthwise direction, they are regarded as being substantially disposed in the lengthwise direction when they are broken by a tension mode. Nevertheless, fibers that are disposed in directions other than the longitudinal direction may be contained for the convenience of formation from the view point of productivity. The ratio of the reinforcing fibers disposed in the lengthwise direction to all the reinforcing fibers is preferably 70% or more and more preferably 80% or more. For example, when an impact energy absorption member containing carbon fibers is formed by drawing, organic fibers and glass fibers may be disposed at portions in contact with a forming metal mold to reduce the wear thereof. Further, the application of twist of about 2 times/m to 10 times/m has an effect for suppressing breakage of strings, and this is preferable in processing.

The reinforcing fibers are contained preferably in an amount of 35 to 99 vol % and more preferably in an amount of 50 to 90 vol %. Note that the fiber content can be measured according to JIS K7052.

Next, the matrix resin used in the present invention will be described. Exemplified as the matrix fiber used in the present invention are thermosetting resins such as epoxy resins, vinyl ester resins, unsaturated polyester resins, phenol resins, benzoxazine resins, etc., thermoplastic resins such as polyethylene resins, polyamide resins, polypropylene resins, ABS resins, polybutylene telephthalate resins, polyacetal resins, polycarbonate resins, etc., and denatured resins obtained by making these resins to alloys.

Polyvinyl chlorides are preferable because they are excellent in a low temperature performance. The epoxy resins, the polyester resins, vinyl ester resins, and the denatured resins thereof can be preferably used as a material for the field of the transportation equipment because they are excellent in draw forming property as well as in chemical and weather resistance. Further, the phenol resins and the benzoxazine resins are preferable because they are excellent in noncombustibility and generate a less amount of gas when they are burnt.

Further, when a recycle property and a shape application property are necessary, the thermoplastic resins such as the polypropylene resins and the like can preferably be used.

Further, since the object of the matrix resins is not to exert compression strength, rubber-like matrix resins having an elastic modulus of about 20 MPa may be used. When characteristics other than impact absorbing characteristics are taken into consideration, it is preferable that the elastic modulus of the matrix resins is within the range of 100 to 600 Mpa.

Next, the long member of the present invention may be of a sheet shape, a rope shape (FIG. 6), a belt shape, a wire shape, a chain shape, a net shape(FIG. 7), and a thin sheet shape as long as the entire cross section thereof is deformed by being extended in the aforementioned pendulum impact test. However, an amount of deformation larger than a certain degree is necessary from the meaning of absorbing a larger amount of impact energy and reducing an impact load applied to a crew. Thus, it is more preferable that the curvature of the long member when it is bent be 1 m or less. This is because that since an amount of absorbed energy is the product of a load (P) and an amount of dislocation (S), when the amount of dislocation is made to one half in the absorption of the same amount of energy, the load is doubled.

The curvature in bending can be measured by bending a member cut to 500 to 1000 mm at three points and geometrically determining the center of the curvature of the member from the photograph of the bent member.

Further, the impact energy absorption member of the present invention is disposed so that a direction in which an impact force acts is in agreement with the thickness direction of the member. This is because that when the impact force acts on the impact energy absorption member, tension, that is, a drawing force acts on fibers disposed in the lengthwise direction. Note that fibers may be twisted each other (principle of rope) so as to increase the capability thereof for bearing a tensile load. More specifically, a rope, a belt, and a string-shaped material can be exemplified as this arrangement. Further, it is preferable that a sheet member form a closed loop to improve an energy absorption performance.

The loop-shaped sheet member has a merit, as compared with a simply long sheet member the ends of which must be jointed to each other by bonding or mechanically, that the weight of which can be reduced because it does not need a jig for jointing the ends and that the weight of which is not increased by the reinforcement that is applied to the simple sheet in consideration of stress concentration. Further, the loop-shaped sheet also has a merit that a mounting job can be easily executed when it is assembled or repaired. Furthermore, the continuous disposition of reinforcing fibers along the loop permits tensile strength to be exerted ideally. As a result, the loop-shaped member has a merit that it can absorb impact energy in a very large amount.

Figure 3:
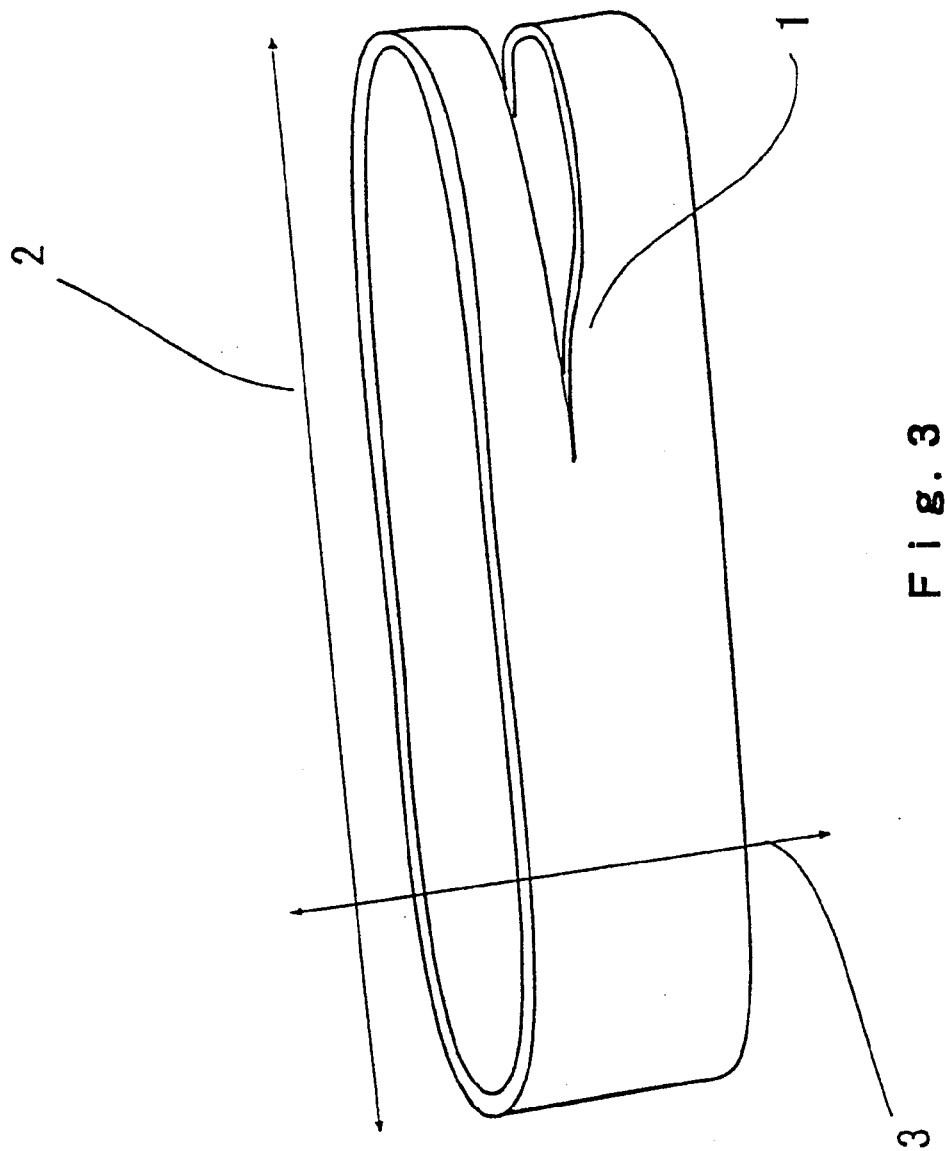
FIG. 3 is a perspective view showing an embodiment of the impact energy absorption member of the present invention which is different from the impact energy absorption members shown in FIGS. 1 and 2.
Figure 4:
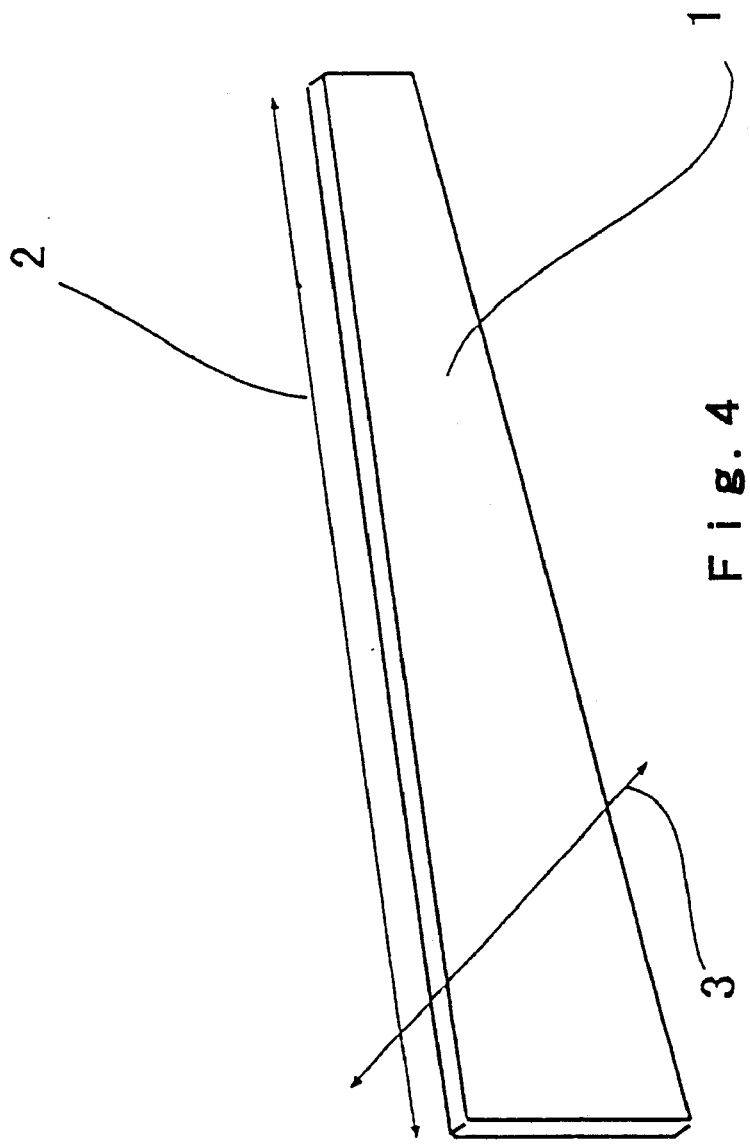
FIG. 4 is a perspective view showing an embodiment of the impact energy absorption member of the present invention which is different from the impact energy absorption members shown in FIGS. 1 to 3.

Note that the width of the closed-loop-shaped sheet member need not be constant and may be tapered as in the absorption member shown in FIG. 4. Further, the closed-loop-shaped sheet member may be separated to a fork-shape at an end as in the absorption member shown in FIG. 3. More specifically, a net-shaped absorption member having a plurality of branched portions as in the absorption member shown in FIG. 7 and a gut-shaped absorption member having intersections are preferable.

Note that when the FRP is broken by being extended, the relationship among the tensile strength ($\sigma$), the elongation (e) and the amount of absorbed energy (E) of the FRP is approximately represented by the following formula. Thus, it is preferable to select a material having suitable strength and elongation according to a necessary amount of energy to be absorbed.

$$E=\tfrac{1}{2}(\sigma e)$$

However, excessively large elongation in the transportation equipment results in an excessively large amount of deformation. In a case of, for example, a door of a motor car, there is a possibility that an impact force reaches a crew when collision occurs on a side of the motor car. From what is mentioned above, it is preferable in the transportation equipment that the tensile elongation in the lengthwise direction of the FRP constituting an FRP member be within the range of 0.3% to 3.5%. The tensile elongation is more preferably within the range of 0.5% to 3%. Note that the elongation of the FRP can be measured according to JIS K7054 or JIS K7074.

Exemplified as the material having the suitable strength and elongation as described above are a carbon-fiber-reinforced composite material, a glass-fiber-reinforced composite material, and the like. In particular, reinforcing fibers having strength of at least 1.5 GPa are preferable because the strength of the fiber-reinforced composite material can be improved by a smaller amount of the reinforcing fibers.

The impact energy absorption member of the present invention specifically find a wide range of uses in the general transportation equipment such as motor cars, which are generically called as an automobile, track, trailer, passenger car, sports car, racing car, motor tricycle, and the like as well as an airplane, motor bicycle, electric car, cargo, vessel and the like.

Figure 2:
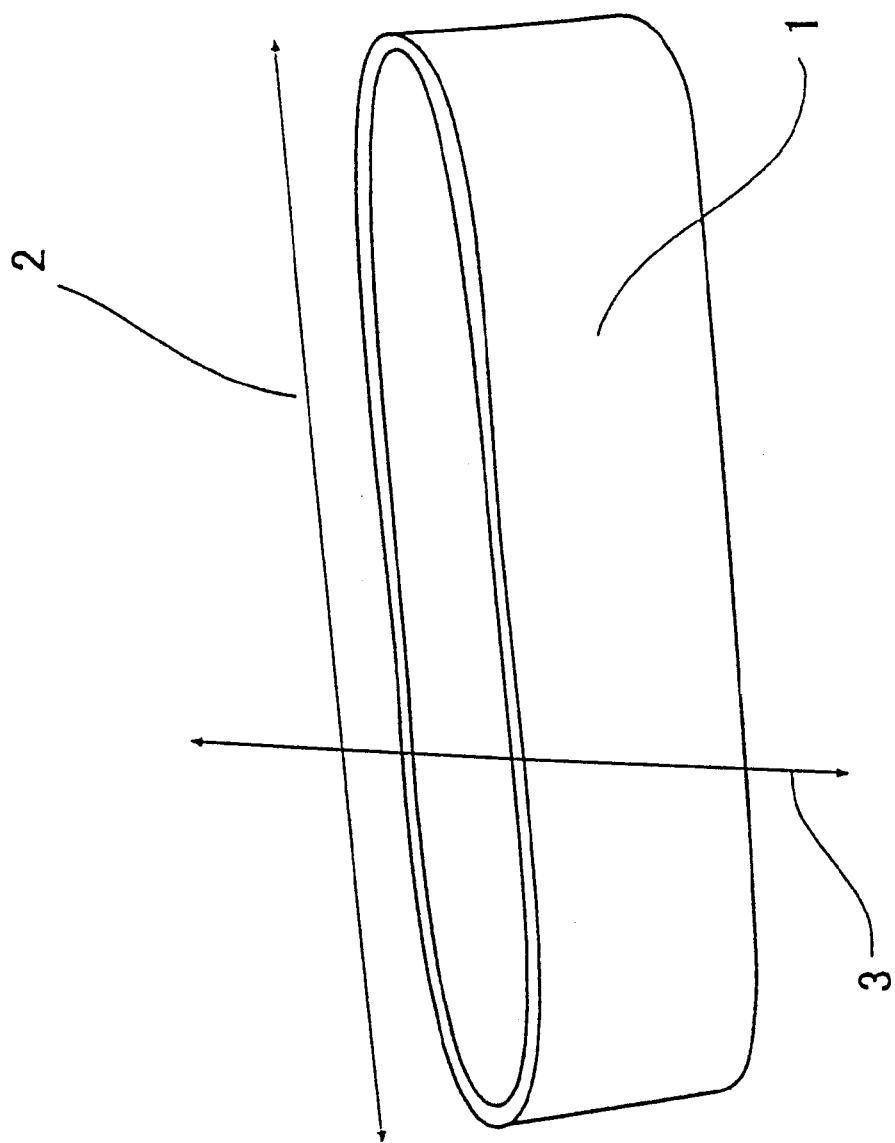
FIG. 2 is a perspective view showing an embodiment of the impact energy absorption member of the present invention which is different from the impact energy absorption member shown in FIG. 1.

Among them, one of preferable uses is a door for a motor car. When the sheet-shaped FRP impact energy absorption member of the present invention is mounted to a portion where a steel pipe called an impact bar is conventionally mounted, it can absorb impact energy generated when collision occurred on a side of a motor car and protect a crew as well as reduce the weight of the door. In a passenger car having a weight of about 1 ton. The sheet member of FIG. 2 that is composed of a carbon-fiber-reinforced composite material having a thickness of 0.5 mm and a width of 100 mm and formed in a closed-loop-shape is fixed to the frame of a door. Fixing jigs such as pins or the like are used as a fixing method, and the fixing jigs are mechanically fixed to the frame as shown in FIG. 5. At this time, it is preferable that the frame be more rigid than a conventional frame. The impact energy absorption member may be fixed after pre-tension is applied thereto to reduce an amount of substances which are generated in collision and enter a cabin.

As other uses of the impact energy absorption member in the transportation equipment, it is installed between an engine room and a cabin for the purpose of preventing engine parts from entering the cabin (passenger's compartment) or installed in the vicinity of fuel parts such as a natural gas tank, hydrogen gas tank, gasoline tank, methanol tank, and so on for the purpose of preventing a fuel vessel from being damaged by an impact and causing fire and the like.

Figure 8:
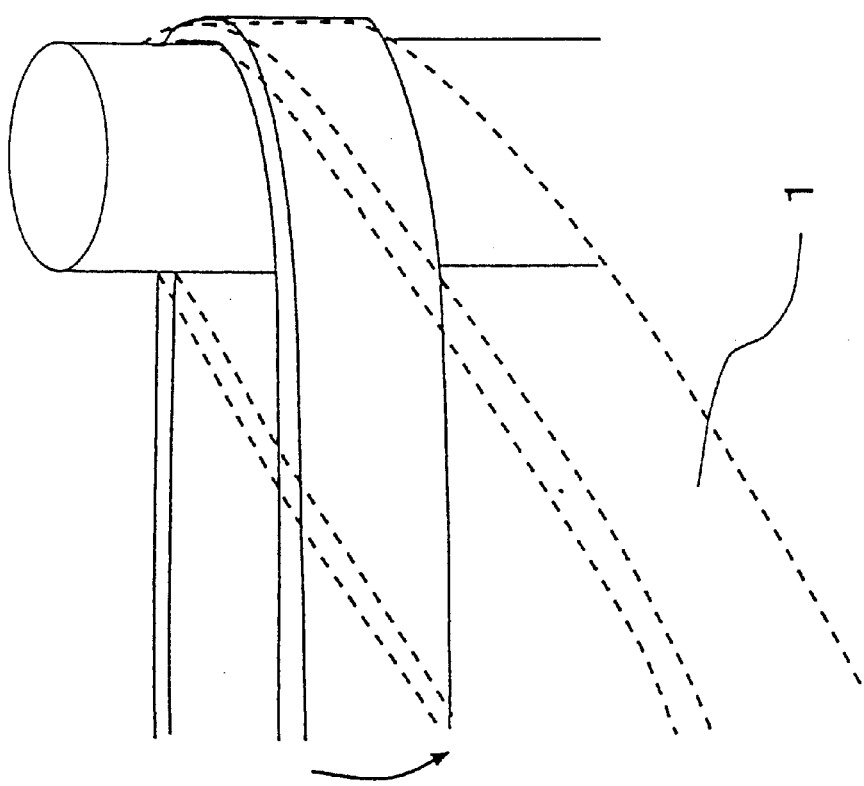
FIG. 8 is a perspective view showing an embodiment of the fixing portion of the impact energy absorption member of the present invention.
Figure 9:
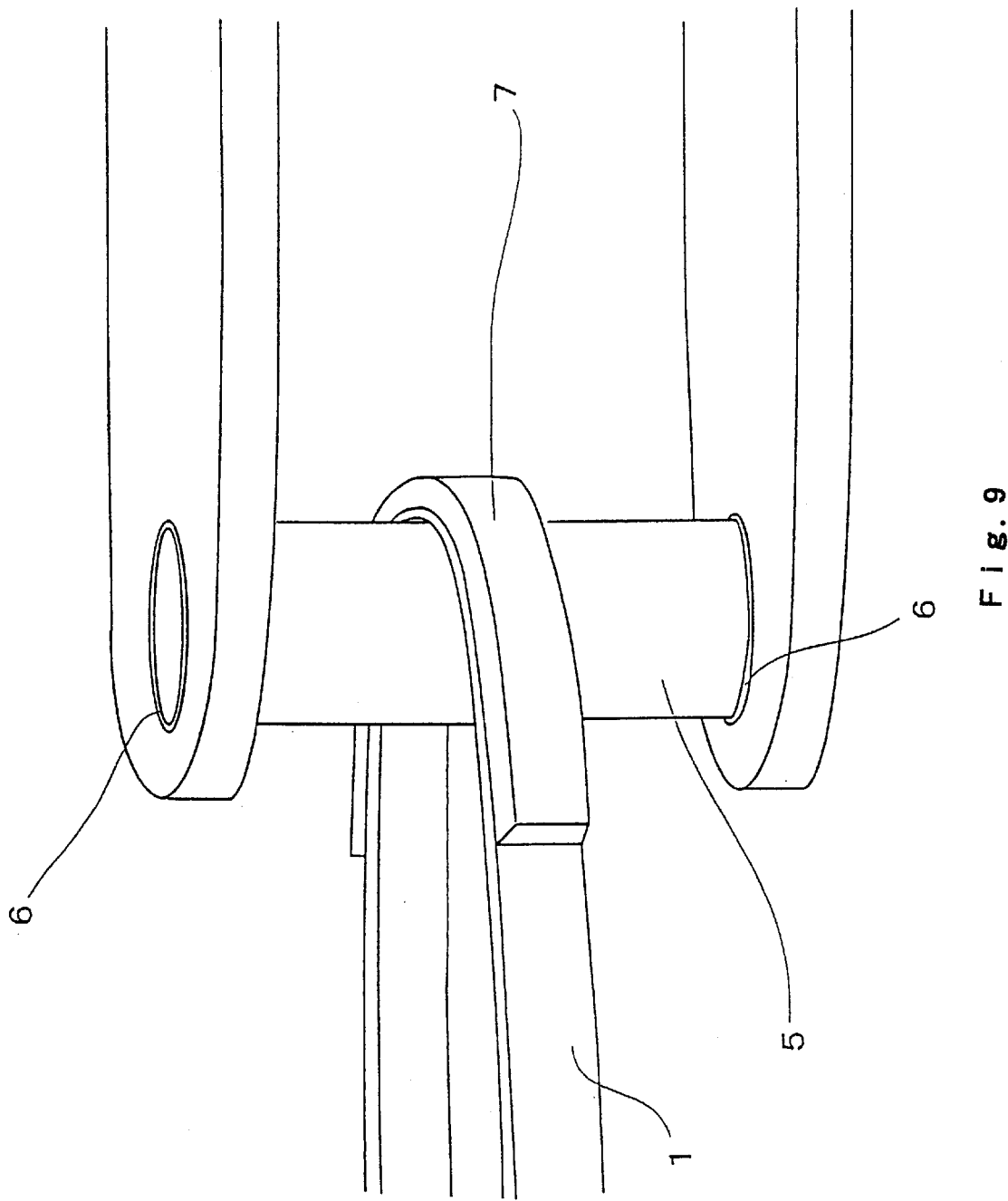
FIG. 9 is a perspective view showing an embodiment of the fixed portion of the impact energy absorption member of the present invention.

Further, it is also possible to make the portion where the impact energy absorption member is fixed to the frame rotatable to ease the stress concentration at the fixing portion so as to suppress the early breakage of the frame in the vicinity of the fixing portion. As a method of making the fixing portion rotatable, there are a method of causing the member of the present invention to be in contact with a pin having a low coefficient of friction and making the member itself rotatable by lubricant (FIG. 8), a method of receiving a pin 6 fixed to a member by support members 6 each provided with a bearing to permit the member to be rotated together with the pin (FIG. 9), and the like. Making the fixed portion rotatable enables only tension to act more effectively, whereby a larger amount of energy can be absorbed. Further, it is effective for the increase of an amount of energy to be absorbed to increase the strength of the portion in the vicinity of the fixed portion of a long member by increasing the amount of the reinforcing fibers used in the long member or by partly reinforcing the long member (7 in FIG. 9). In particular, the partial reinforcement can be effectively applied to a portion where stress concentration is liable to occur such as a portion where a curvature increases, a portion where the long member comes into contact with other member, and the like.

As described above, while the impact energy absorption member of the present invention is the fiber-reinforced composite material, the category thereof is very wide and includes not only the so-called FRP having high rigidity and strength used for structure but also composite materials used for a belt, rope, tire, and the like.

Figure 6:
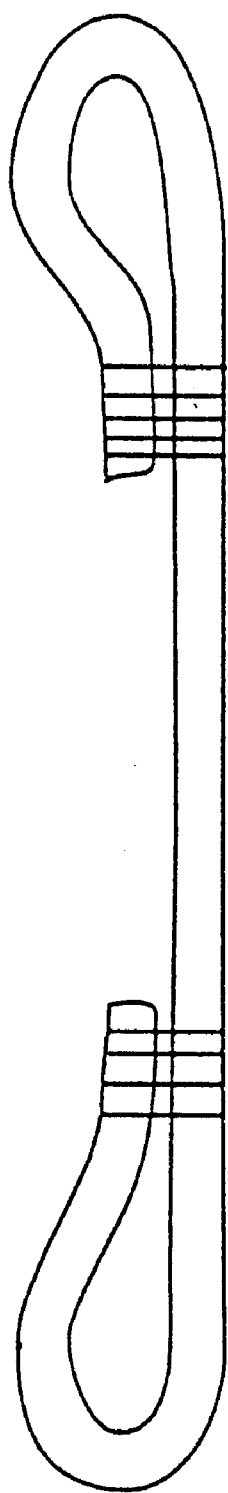
FIG. 6 is a perspective view showing an embodiment of the impact energy absorption member of the present invention.
Figure 7:
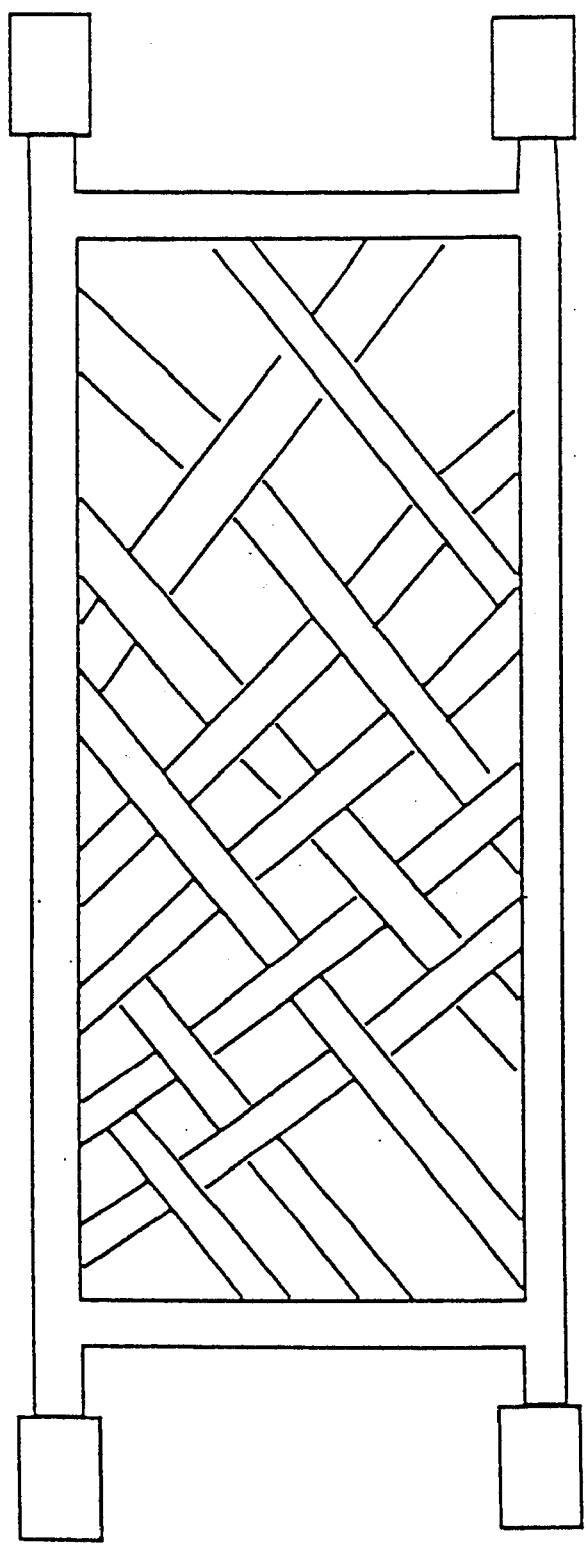
FIG. 7 is a perspective view showing an embodiment of the impact energy absorption member of the present invention.

In shapes other than the sheet shape, a rope shape is preferable because it is excellent in an abrasion property (FIG. 6). More specifically, strand-shaped reinforcing fibers are arranged as a braided-cord-like fibers or a twisted fibers, and a rope is arranged by combining these fibers. In the case of the rope shape, an end the rope may be returned and caulked by metal fitting, may be subjected to SATSUMA-end knitting or the like, or may be fixed by being sewed with a sewing thread which is a method called stitching. In addition to the above, the end of the rope may be processed by screw-end clamp, eye-end clamp, jaw-end clamp, SHINKO clamp, end supported socket clamp, open type socket, DINA anchor, and the like, similarly to a steel wire. Among them, when the end is processed by the screw-end clamp, the absorption member can be jointed to a vehicle body, a vehicle, and the like through a screw, which is suitable to assemble and disassemble them.

Further, as described below, a state without an end (endless state) may be provided by forming a rope or the like to a loop. In an impact energy absorption member formed in the loop shape, it is also preferable to reinforce the overlapped portion thereof by caulking it with metal fitting or the like or by further winding reinforcing fibers around the overlapped portion so that the entire cross section of the absorption member can effectively bear a tensile load. It is needless to say that the amount of the reinforcing fibers is increased or decreased as necessary in portions other than the overlapped portion to reduce the weight of the absorption member.

As described above, in the impact energy absorption member of the present invention, fibers of high strength are subjected to breakage by tension that exhibits the highest energy absorbing efficiency so as to absorb energy generated when an impact is applied to the absorption member. Accordingly, the impact energy absorption member can be utilized also as an installation type energy absorption member for protecting the transportation equipment including motor cars as well as buildings and houses against which the transportation equipment may collide from an impact. A specific example is an energy absorption member which is used in place of a protection fence, a guard rail, and the like.

Next, a method of manufacturing the sheet-shaped impact energy absorption member of the present invention will be described. To manufacture the impact energy absorption member of the present invention, all the technologies including a filament winding method, a pulltrusion process, a pull/wind method, a hand lay up method, a resin transmolding method, and so on can be used. Among them, the pulltrusion process and the pull/wind methods are preferable because they can continuously manufacture a loop-shaped impact energy absorption member in which reinforcing fibers are disposed in the longitudinal direction of a sheet by using a tubular metal mold, disposing fibers in the radial direction of the tube and cutting the tube in round slices.

Further, the filament winding method also is a preferable forming method. For example, when the loop-shaped impact energy absorption member is manufactured, reinforcing fibers or reinforcing fibers impregnated with matrix resin are wound around a mandrel having a cross section corresponding to a desired loop shape and then entirely, partly or additionally impregnated with matrix resin. Subsequently, the matrix resin is hardened on the mandrel or after it is removed therefrom, thereby obtaining a tubular member. Further, the tubular member is cut in round slices having a necessary width to thereby obtain the impact energy absorption member of the present invention. Further, in the aforementioned draw forming method and the filament winding method, since reinforcing fibers are formed continuously around the entire periphery of a loop, there can be obtained a most preferable impact energy absorption member that has very high tensile strength and is uniform.

Further, a rope- and string-shaped impact energy absorption members can be manufactured in such a manner that reinforcing fiber strands or reinforcing fiber strands impregnated with resin are knitted or formed to a twisted structure using a braided-string manufacturing apparatus such as a braider, further a plurality of strands are twisted and impregnated with resin, and then the resin is hardened.

Next, an example to which various types of the impact energy absorption members of the present invention are most preferably applied will be described.

Figure 10:
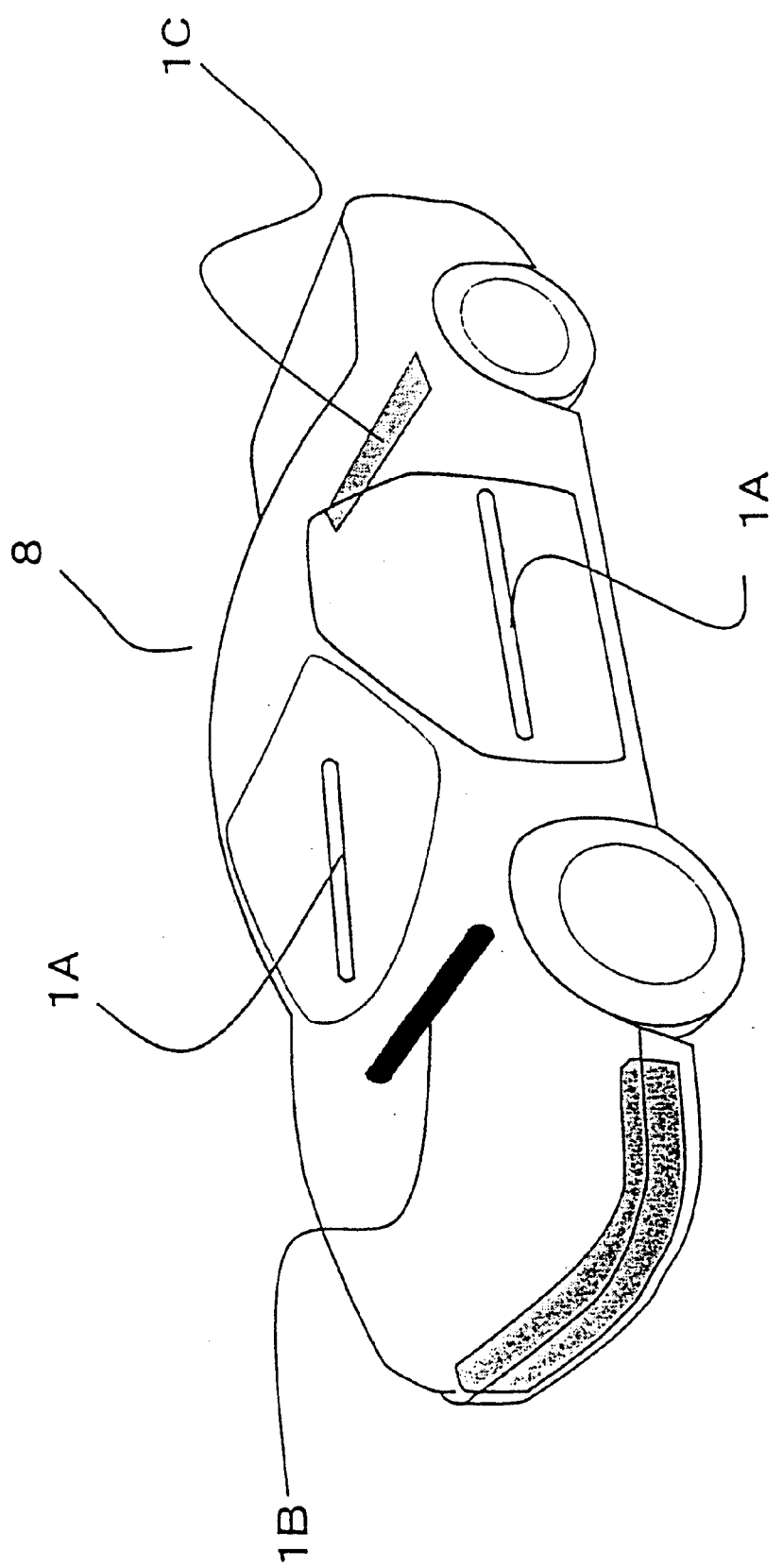
FIG. 10 is a perspective view showing a most preferable example in which the impact energy absorption member of the present invention is applied to a motor car.
Figure 11:
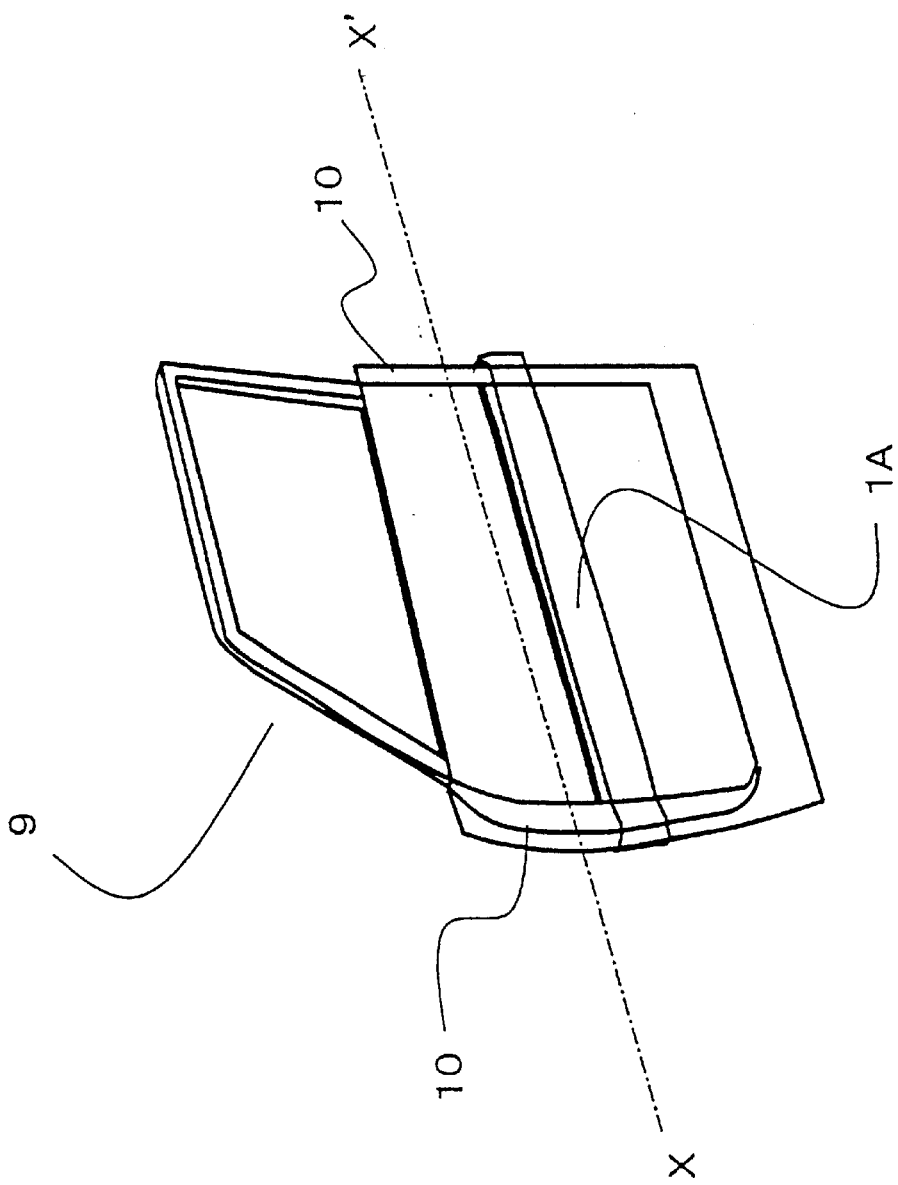
FIG. 11 is a perspective view when a door 4 in FIG. 4 is viewed from a compartment.
Figure 12:
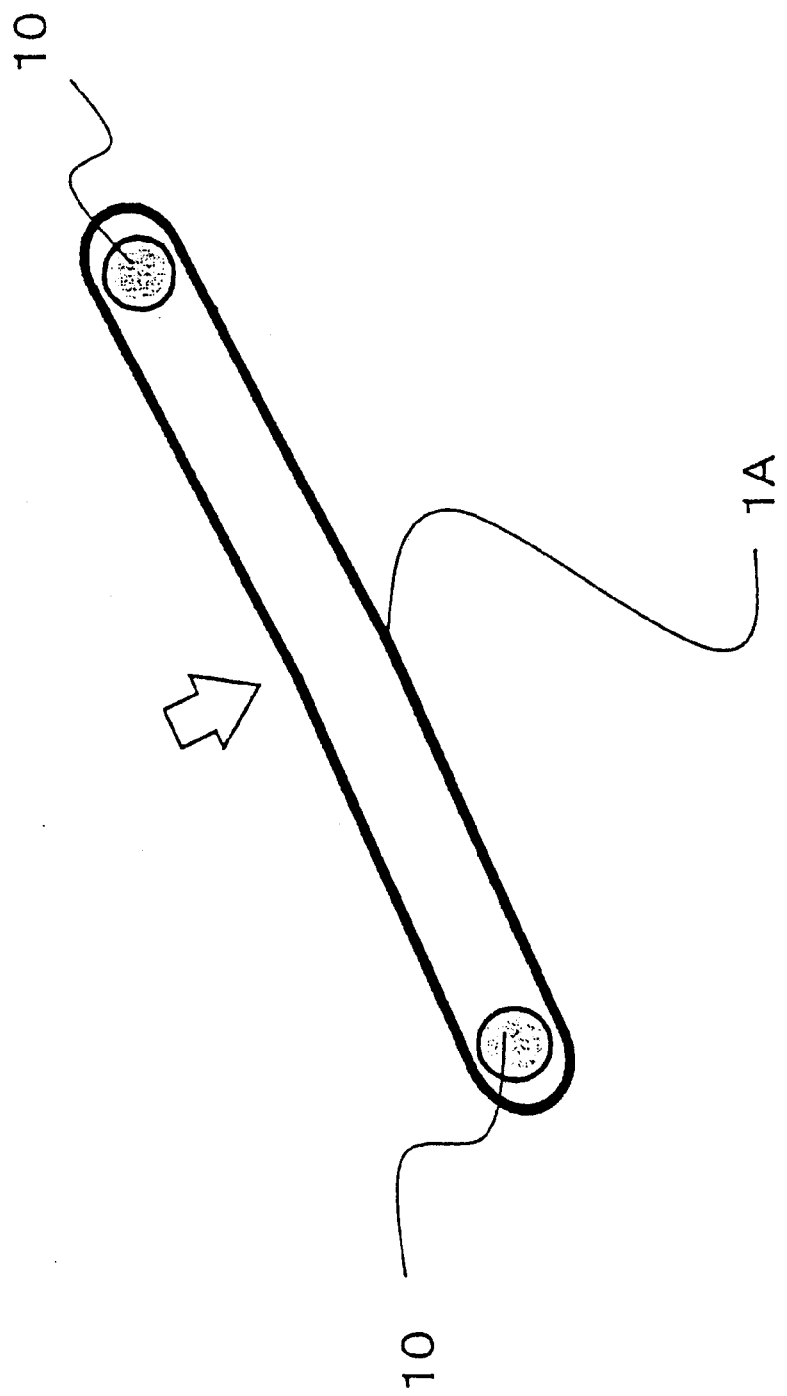
FIG. 12 is a sectional view in the direction of the arrow X—X of FIG. 11.

FIG. 10 is a perspective view of a motor car 8 in which impact energy absorption members 1A to 1C of the present invention are used, wherein the impact energy absorption member 1A is used to absorb impact energy generated from a door; the impact energy absorption member 1B is used to absorb impact energy generated from an engine accommodated in an engine hood; and the impact energy absorption member 1C is used to absorb energy generated in rear-end collision. Any of the embodiments of the impact energy absorption member of the present invention can be applied to the above uses. Among these absorption members, the impact energy absorption member 1A will be described in detail. FIG. 11 is a perspective view in which a door 9 in FIG. 10 is viewed from a cabin. The door 9 includes a pair of right and left rotatable bars 10 that are rotatably disposed on both the sides of the interior of the door 9 and the impact energy absorption member 1A of the present invention that is stretched between the pair of rotatable bars 10. As shown in FIG. 12 which is a sectional view in the direction of the arrow X—X of FIG. 11, the impact energy absorption member 1A is formed in an endless belt shape (the one shown in FIG. 2 described above) and stretched so as to surround the pair of rotatable bars 10.

When the impact energy absorption member 1A arranged as described above is disposed on the inner surface side of the door 9, if impact energy is applied by a traffic accident or the like in the direction of the cabin from the outside of the door, that is, if impact energy is applied in the direction of a white arrow in FIG. 12, first, the impact energy absorption member 1A receives the impact energy and converts it to cause the entire lateral cross section thereof that is perpendicular to the lengthwise direction thereof to be deformed by being extended. In other words, the impact energy is converted into the deformation due to elongation of the entire cross section of the absorption member, and the impact energy is resisted only by the tensile stress, different from a conventional impact energy absorption member that intends to absorb impact energy through the partial plastic deformation thereof. As a result, the impact energy absorption member 1A can absorb a very large amount of impact energy. At this time, the rotatable bars 10 rotate following the dislocation of the impact energy absorption member at the occurrence of collision and uniformly disperse locally applied impact energy to the entire cross section of the overall length of the end-belt-shaped impact energy absorption member 1A that has been deformed by being extended, whereby a larger amount of impact energy can be absorbed.

EXAMPLE 1

Carbon fibers were used as reinforcing fibers, and the strands of "Toreca" T700S (elastic modulus: 235 GPa, strength: 5 GPa, elongation: 2.1%) supplied by Toray were impregnated with bisphenol A type epoxy resin and subjected to filament winding, and the resin was hardened in an oven at 130° for 2 hours. With this processing, impact energy absorption members each composed of a closed-loop-shaped FRP sheet member (containing the carbon fibers in the amount of 60 vol %) were obtained. Each absorption member had a width of 50 mm, a thickness of 0.3 mm, and a length of 100 mm. The tensile strength of these members was 2700 Mpa, and the elongation thereof was 2.1%.

An impact test of the sheet members was carried out by mounting them on a home-built pendulum impact tester described in this specification and shown in FIG. 5 through four pins. As a result, the sheet members were broken by being extended and divided into pieces, and the value of energy absorbed per unit weight of each sheet member was 17.5 J/g. Further, when broken cross section were observed with a scanning type electron microscope (model: SEM-XMA S4000 made by Hitachi Corp.) with magnification of ×5000, it was admitted that fibers was drawn out from the entire cross sections, whereby it could be confirmed that they were broken by being extended. (Table 1)

TABLE 1

| | Impact energy absorbing material | | | | | | | | | | | | | |
|---|---|---|---|---|---|---|---|---|---|---|---|---|---|---|
| | | Constitution | | Size | | | | Physical properties in longitudinal direction | | | | Result of impact test | | |
| | Forming method | Fiber-reinforced resin | Vf % | Thickness (t) mm | Width (B) mm | Length (L) mm | t/L | Strength (σ) MPa | Elongation (e) % | Elastic modulus GPa | Weight g | Amount of absorbed energy (E) | | Joint method | Mode of breakage |
| | | | | | | | | | | | | J/g | J/cm³ | | |
| Example 1 | FW | Carbon fiber Epoxy | 60 | 0.3 | 50 | 1000 | 0.0003 | 2700 | 2.1 | 135 | 24 | 17.5 | 28.4 | Pin | Drawing |

TABLE 1-continued

Impact energy absorbing material

| | Constitution | | | Size | | | | Physical properties in longitudinal direction | | | Result of impact test | | | |
|---|---|---|---|---|---|---|---|---|---|---|---|---|---|---|
| | Forming method | Fiber-reinforced resin | Vf % | Thickness (t) mm | Width (B) mm | Length (L) mm | t/L | Strength (σ) MPa | Elongation (e) % | Elastic modulus GPa | Weight g | Amount of absorbed energy (E) J/g | J/cm³ | Joint method | Mode of breakage |
| Example 2 | FW | Carbon fiber Epoxy | 60 | 0.5 | 100 | 600 | 0.0008 | 2700 | 2.1 | 135 | 48 | 16.9 | 27.0 | Pin | Drawing |
| Example 3 | Prepreg | Carbon fiber Epoxy | 58 | 0.1 | 100 | 1000 | 0.0001 | 2500 | 1.9 | 130 | 15 | 14.3 | 22.8 | Pin | Drawing |
| Example 4 | Hand lay-up | Carbon fiber Vinyl ester | 90 | 1.0 | 100 | 600 | 0.0017 | 2400 | 2.5 | 150 | 105 | 13.7 | 24.1 | Pin | Drawing |
| Example 5 | Pull wind | Carbon fiber Polyester | 70 | 1.0 | 65 | 1200 | 0.0008 | 2900 | 1.8 | 160 | 133 | 12.0 | 20.4 | Bolt | Drawing |
| Example 6 | Prepreg | Carbon fiber Epoxy | 55 | 2.8 | 100 | 1000 | 0.0028 | 1200 | 1.0 | 125 | 122 | 3.9 | 6.0 | Pin | Drawing |
| Example 7 | FW | Kevlar Epoxy | 60 | 0.7 | 40 | 1200 | 0.0006 | 2100 | 2.9 | 75 | 44 | 22.3 | 29.0 | Pin | Drawing |
| Example 8 | Hand lay-up | Glass fiber Vinyl ester | 40 | 1.4 | 100 | 600 | 0.0023 | 700 | 3.0 | 25 | 170 | 5.0 | 7.5 | Bolt | Drawing |
| Example 9 | FW | Carbon fiber Epoxy | 56 | 0.5 | 100 | 600 | 0.0008 | 950 | 0.4 | 320 | 54 | 4.2 | 7.5 | Bolt | Drawing |
| Example 10 | Twisted fiber | Kevlar Epoxy | 99 | 5 | 5 | 1000 | 0.005 | 1100 | 3.0 | — | 26 | 5.5 | 18.8 | Loop | Drawing |
| Comparative example 1 | FW | Carbon fiber Epoxy | 60 | 2.2 | 100 | 600 | 0.0037 | 2700 | 2.1 | 235 | 192 | 3.8 | 6.0 | Bolt | Bending |
| Comparative example 2 | | Steel pipe | | Wall thickness = 1 | Diameter = 30 | 700 | 0.0014 | 1000 | — | 210 | 1040 | 0.4 | 3.0 | Bolt | Bending |

EXAMPLES 2–9

When sheet members were manufactured under the conditions shown in Table 1 and broken by the impact of a pendulum similarly to the example 1, the values of absorbed energy shown in Table 1 were obtained. Further, when broken cross sections were observed with the scanning type electron microscope similarly to the example 1, it was admitted that fibers was drawn out from the entire cross sections, whereby it could be confirmed that they were broken by being extended.

COMPARATIVE EXAMPLE 1

When sheet members were manufactured similarly to the example 2 except that a thickness was set to 2.2 mm and tested, they were broken by being bent. At that time, the value of energy absorbed per unit weight was 3.8 J/g which was about one fourth that of the example 2. Further, when broken cross sections were observed with the scanning type electron microscope similarly to the example 1, fibers was drawn out from half of the cross sections, whereby it could be confirmed that they were broken by being extended. However, the remaining half of the broken cross sections were covered with resin and almost no fiber was observed, whereby it could be confirmed that they were broken by being compressed. Thus, it could be confirmed that the sheet members were broken by so-called bending as a whole.

COMPARATIVE EXAMPLE 2

When steel pipes were tested with the pendulum impact tester in place of FRPs, the pipes were broken by being bent. At that time, the value of energy absorbed per unit weight was 0.4 J/g.

EXAMPLE 10

Ropes each having a thickness of 5 mm were manufactured by way of trial by twisting aramid fibers (Kevlar 49) of 3000 denier. Then, long members each having a length of 1000 mm were manufactured by bending both the ends of the ropes in a loop shape, impregnating the loop portions with room-temperature-hardening-type epoxy resin, caulking both the ends with steel fitting of 1 mm thick, and hardening the epoxy resin. Subsequently, when each long member was mounted on the pendulum impact tester and tested similarly to the example 1, it was broken by being extended. At that time, the value of energy absorbed per unit weight was 5.5 J/g.

INDUSTRIAL APPLICABILITY

According to the present invention, a very superior and conventionally unobtainable impact energy absorption member that is easily broken in a tension mode and excellent in impact energy absorbing characteristics regardless of that it is light in weight can be obtained, whereby a member for transportation equipment that is excellent in impact resistance can be obtained.

What is claimed is:

1. An impact energy absorption member comprising a long member of fiber reinforced resin of endless shape and a support member to which the long member is fixed in an extended state, wherein the long member has a ratio of thickness t to length L within the range of 1/11000 to 6/1000 and is capable of absorbing energy per unit weight of at least 3.9 J/g in a pendulum impact test.

2. An impact energy absorption member according to claim 1, wherein the long member is formed in a sheet shape and the ratio t/L thereof is 1/11000-3/1000.

3. An impact energy absorption member according to claim 2, wherein the elongation (e) in the longitudinal direction of the fiber reinforced resin is within the range of 0.3 to 3.5%.

4. A An impact energy absorption member according to claim 2, wherein the tensile strength of the reinforcing fibers constituting the fiber-reinforced resin is at least 1.5 GPa.

5. An impact energy absorption member according to claim 2, wherein the reinforcing fibers constituting the fiber-reinforced resin contain at least carbon fibers.

6. An impact energy absorption member according to claim 2, wherein the ratio of the reinforcing fibers that are disposed in the lengthwise direction of the long member to all the reinforcing fibers contained in the fiber-reinforced resin is at least 80%.

7. An impact energy absorption member according to claim 2, wherein the amount of energy absorbed by the long member is at least 5 J/cm$^3$.

8. An impact energy absorption member according to claim 2, wherein the resin of the fiber-reinforced resin comprises thermoplastic resin.

9. An impact energy absorption member according to claim 2, wherein the long member is partly reinforced.

10. An impact energy absorption member according to claim 2, wherein the fiber-reinforced resin is formed by a filament winding method or a pull/wind method.

11. An impact energy absorption member according to claim 1, wherein the elongation (e) in the longitudinal direction of the fiber reinforced resin is within the range of 0.3 to 3.5%.

12. An impact energy absorption member according to claim 1, wherein the tensile strength of the reinforcing fibers constituting the fiber-reinforced resin is at least 1.5 GPa.

13. An impact energy absorption member according to claim 1, wherein the reinforcing fibers constituting the fiber-reinforced resin contain at least carbon fibers.

14. An impact energy absorption member according to claim 1, wherein the ratio of the reinforcing fibers that are disposed in the lengthwise direction of the long member to all the reinforcing fibers contained in the fiber-reinforced resin is at least 80%.

15. An impact energy absorption member comprising a long member having a ratio of thickness t to length L within the range of 1/11000 to 6/1000 and which is capable of absorbing energy per unit weight of at least 3.9 J/g in a pendulum impact test, and a support member of the long member, wherein the support member is rotatable according to the deformation of the energy absorption member when an impact is applied to the long member.

16. An impact energy absorption member according to claim 15, wherein the long member is formed in a sheet shape and the ratio t/L is 1/11000 -3/1000.

17. An impact energy absorption member according to claim 1, wherein the long member is of a rope shape or of a wire shape.

18. An impact energy absorption member according to claim 1, wherein the amount of energy absorbed by the long member is at least 5 J/cm$^3$.

19. An impact energy absorption member according to claim 1, wherein the resin of the fiber-reinforced resin comprises thermoplastic resin.

20. An impact energy absorption member according to claim 1, wherein the long member is partly reinforced.

21. An impact energy absorption member according to claim 1, wherein the fiber-reinforced resin is formed by a filament winding method or a pull/wind method.

* * * * *